2 Sheets--Sheet 1.

J. HALL.
Wind-Mill.

No. 6,681. Reissued Oct. 5, 1875.

WITNESSES
E. H. Bates
George P. Ellsworth

By

INVENTOR
James Hall,
Chipman Frown & Co.
Attorneys

N. PETERS, PHOTO-LITHOGRAPHER, WASHINGTON, D. C.

J. HALL.
Wind-Mill.

No. 6,681. Reissued Oct. 5, 1875.

WITNESSES
E. H. Bates
George E. Upham

By

INVENTOR
James Hall,
Chipman & Fosum & Co
Attorneys

N. PETERS, PHOTO-LITHOGRAPHER, WASHINGTON, D. C.

UNITED STATES PATENT OFFICE.

JAMES HALL, OF LIGONIER, INDIANA.

IMPROVEMENT IN WINDMILLS.

Specification forming part of Letters Patent No. 132,464, dated October 22, 1872; reissue No. 6,681, dated October 5, 1875; application filed August 14, 1875.

*To all whom it may concern:*

Be it known that I, JAMES HALL, of Ligonier, in the county of Noble and State of Indiana, have invented a new and valuable Improvement in Windmills; and I do hereby declare that the following is a full, clear, and exact description of the construction and operation of the same, reference being had to the annexed drawing making a part of this specification, and to the letters and figures of reference marked thereon.

Figure 1:
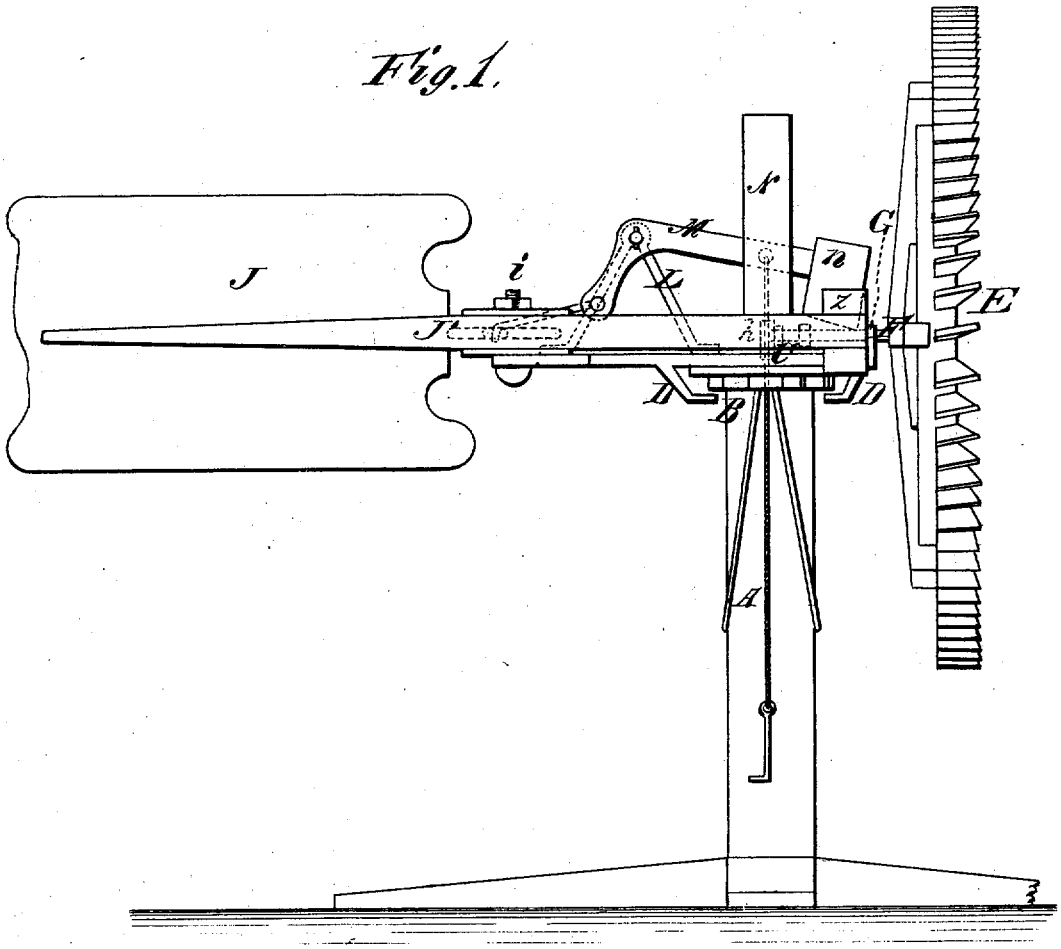
Figure 2:
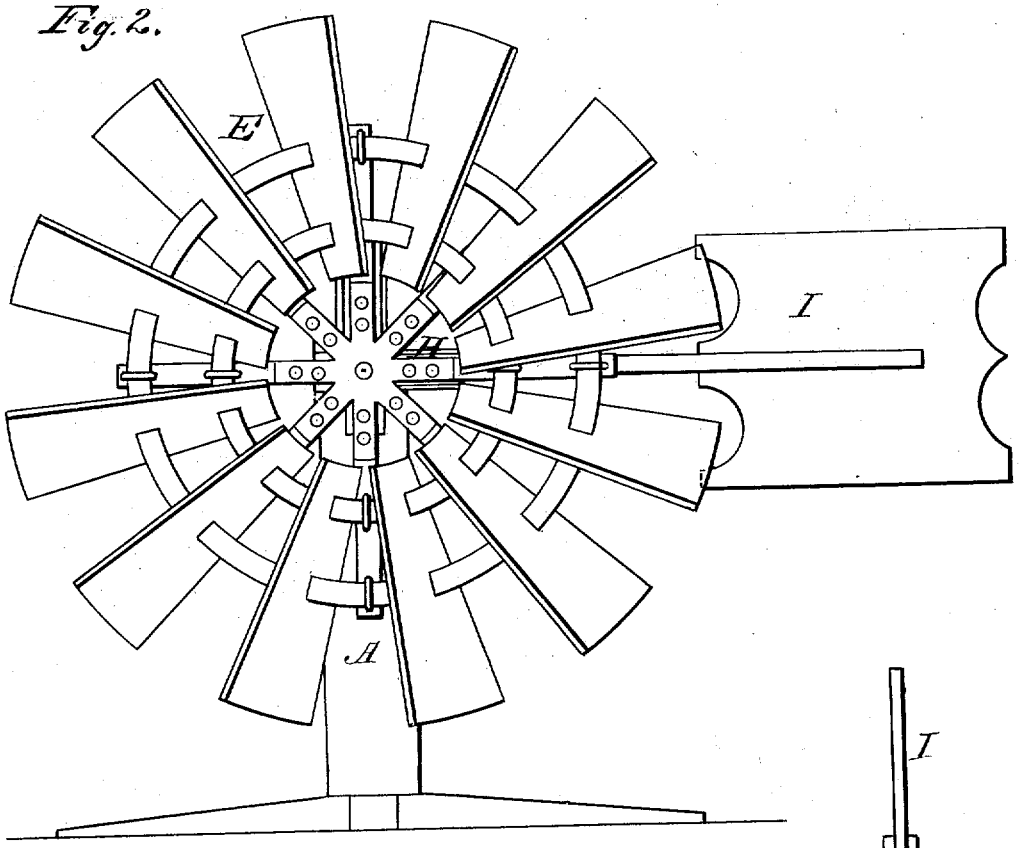
Figure 3:
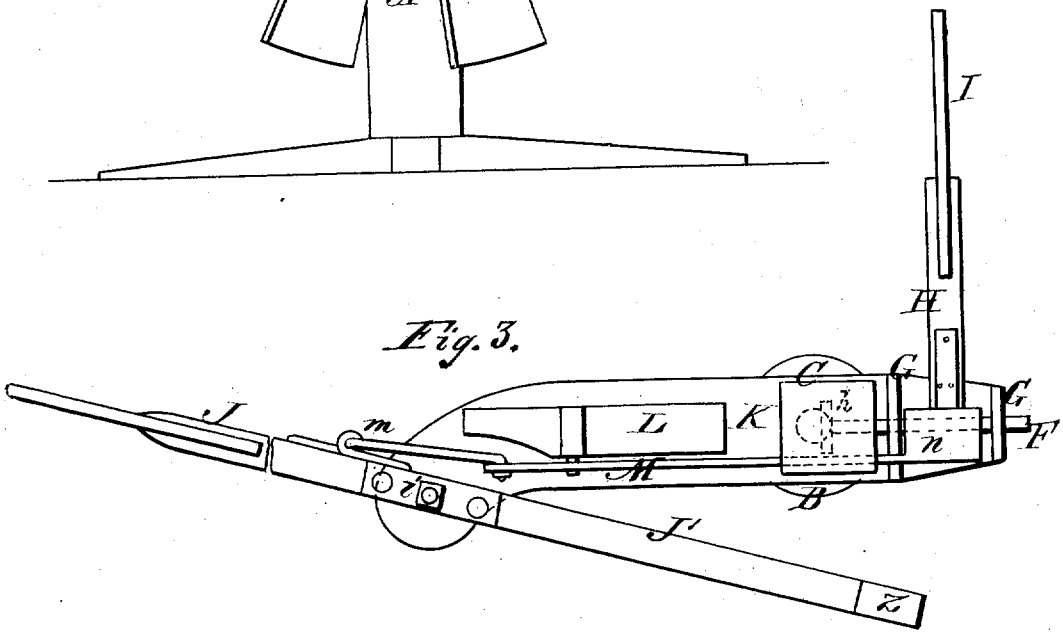

Figure 1 of the drawing is a representation of a side view of my invention. Fig. 2 is a front view of the same. Fig. 3 is a top view of the same.

This invention has relation to windmills which are so constructed that they will automatically "edge" or adjust themselves to the wind as the force thereof increases or diminishes.

The nature of my invention consists in the extension of the arm or shaft of the principal tail vane past the pivoted point of said arm or shaft, for the purpose of carrying a weight sufficient to balance the said vane, as will be hereinafter explained.

The invention also consists in locating the pivot of the principal vane-shaft in such relation to the vertical axis of the turn-table as will allow me to balance the vane-arm on opposite sides of the turn-table, and at the same time allow the principal vane to assume a position which is in a plane at right angles to the plane of the wind-wheel.

The invention finally consists in a certain novel arrangement of parts about the vertical axis of the turn-table, whereby all the movable parts of the mill will be balanced on said turn-table, whether the mill be running or at rest, as will be hereinafter explained.

In the annexed drawings, A designates the windmill-pedestal supporting the plate B, upon which the turn-table C, having L-shaped guides D, is arranged. E designates the wind-wheel, and F the horizontal shaft to which the same is attached. G G designate the bearings for the said shaft, and *h* a crank-wheel on the inner end of this shaft. H designates an arm, which is secured rigidly to the turn-table, and which extends therefrom at a right angle to the shaft F, and carries a wing or vane, I. J designates the principal vane, having its arm, J′, pivoted to the end of an extension, K, of the turn-table, which extension is curved, as shown in Fig. 3, so that the pivot *i* of said arm J′ is on one side of the middle of the width of the extension K, which allows the arm J′ to swing around at right angles to the plane of the wheel E without passing across the center of the turn-table. L designates a standard rising from the extension K, and having pivoted to its upper part an L-shaped lever, M, the long arm of which holds a weight, *n*, while the short arm is connected with the arm J′ of the principal vane by means of a rod, *m*, which is pivoted to the latter at a point between the pivot thereof and the vane.

Under ordinary circumstances, as when the wind is moderate, the wheel E faces or nearly faces it, and the vane J stands on a line with the shaft F; but when the wind rises, its force, acting upon the vane I, carries the wheel E around, so that its edge will be toward the wind, in which position the wind will have less effect upon it. As the wheel, together with the turn-table, is thus carried around, the vane J is brought against the wind, and, resisting the same, remains still until the face of the wheel E becomes parallel with it. By these means the loaded end of the lever M is raised. When the gale moderates the weight *n* falls, and the vane J swings around, causing the wheel to face the wind again. The end of the vane-arm is loaded, as shown at *z*, to balance this arm, and allow it to swing easily at all points. When the wind is slightly above the required condition, the wheel will be governed accordingly, and will be turned obliquely thereto. N designates an arch, to prevent the loaded lever from being raised too high, and the wheel, in consequence thereof, driven around too far.

What I claim as new, and desire to secure by Letters Patent, is—

1. In the windmill described, the arm J′, pivoted at *i* to the offset of turn-table extension K, and carrying on one end a vane, J, and on the other a balancing-weight, *z*, substantially as described.

2. In combination with the turn-table extensions K, the vane I, wheel E, and the vane-carrying arm J′, pivoted and balanced as described.

3. The pivoted vane-carrying lever J, lever M, connecting-arm *m*, and weight *n*, in combination with the wheel E, turn-table C, and vane I, substantially as described.

In testimony that I claim the above I have hereunto subscribed my name in the presence of two witnesses.

JAMES HALL.

Attest:
V. C. MAINS,
JOHN V. GILBERT.